United States Patent

[11] 3,622,393

| [72] | Inventors | Robert E. Sherwood<br>Westport, Conn.;<br>Erhard Decker, Hamburg, Germany |
|---|---|---|
| [21] | Appl. No. | 806,265 |
| [22] | Filed | Mar. 11, 1969 |
| [45] | Patented | Nov. 23, 1971 |
| [73] | Assignee | W. R. Grace & Co.<br>Cambridge, Mass. |
| [32] | Priority | Mar. 12, 1968 |
| [33] | | Germany |
| [31] | | P 16 17 803.9 |

[54] CONTINUOUS PROCESS FOR MANUFACTURING MICROPOROUS BATTERY SEPARATORS AND BATTERY SEPARATORS MADE THEREBY
4 Claims, 1 Drawing Fig.

[52] U.S. Cl. ............................................. 136/148, 264/216
[51] Int. Cl. ............................................. H01m 3/00
[50] Field of Search ............................................. 136/146, 148; 264/216; 18/10

[56] References Cited
UNITED STATES PATENTS

| 3,123,654 | 3/1964 | Malischewski | 136/148 X |
| 3,272,657 | 9/1966 | Zenczak | 136/148 |
| 3,328,207 | 6/1967 | Beaulieu et al. | 136/146 |
| 3,444,286 | 5/1969 | King et al. | 264/216 X |
| 3,449,153 | 6/1969 | Saligny et al. | 264/216 X |
| 3,475,355 | 10/1969 | Decker | 136/146 X |
| 3,487,143 | 12/1969 | Bergvall | 264/216 |

Primary Examiner—Donald L. Walton
Attorneys—C. E. Parker, Metro Kalimon and William L. Baker ABSTRACT: Battery separators are formed continuously by placing an aqueous phenolaldehyde resin precursor solution onto a sloped steel or polyfluorocarbon pressure belt which moves upward to a point where it meets another superposed pressure belt of the same material, heating the solution, as it passes through the space between the synchronously moving belts, at a temperature sufficient to cause gellation without loss of water, drying the resulting water-containing sheet after it leaves the confined belt area, curing, and cutting the dry sheet to desired specifications. The resin precursor solution preferably contains resorcinol as well as a thermoplastic resin dispersion. Fillers and fibers may be incorporated.

PATENTED NOV 23 1971 3,622,393
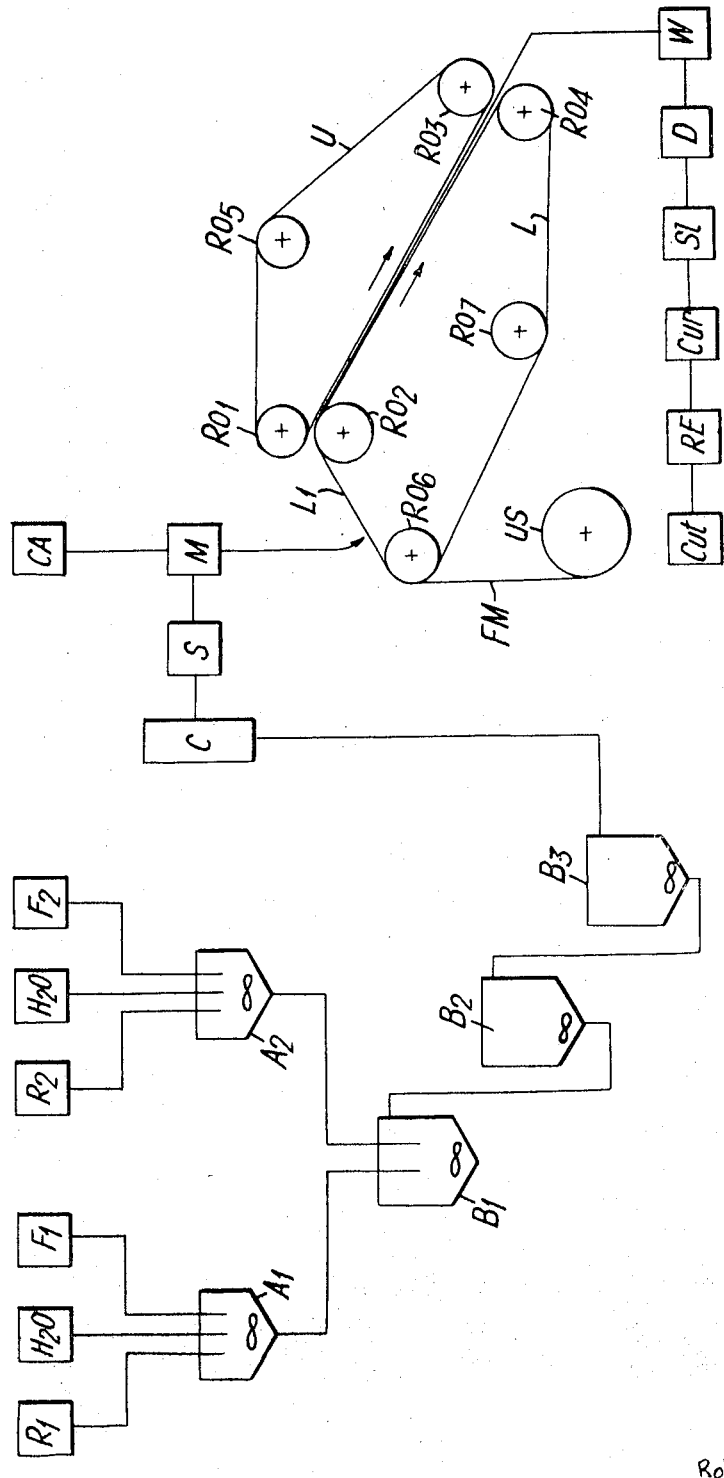
Inventors
Robert Edward Sherwood
& Erhard Decker
By C. E. Parker
Attorney

CONTINUOUS PROCESS FOR MANUFACTURING MICROPOROUS BATTERY SEPARATORS AND BATTERY SEPARATORS MADE THEREBY

The present invention relates to a continuous process for manufacturing novel microporous battery separators. More especially the invention can be used in the production of microporous battery separators which are thermostable and resistant against oxidation and battery acid, and which may be provided with a broad range of mechanical properties like elasticity, impact strength and abrasion resistance.

Battery separators having the desired properties and in particular showing an extremely low electrical resistance while at the same time prohibiting the migration of antimony between the battery electrodes can be made by adding to phenol/formaldehyde solution or to a polymer dispersion a polyhydroxy benzene with activated ortho and/or para position together with formaldehyde, after addition of an accelerator solidifying the mixture by warming it in a closed system to obtain thin sheets or plates with the solvent finely dispersed therein, subsequently evaporating the volatile components and when necessary curing the resin by heating it to elevated temperatures.

Although these separators have excellent electrical properties, very good mechanical strength, and are stable towards chemical attack, particularly by acid or oxidation, it has heretofore not been possible to produce these separators on a commercial basis since only a continuous process operating at sufficient speed can compete economically with the processes presently used in practice for manufacturing battery separators of conventional type.

Accordingly, it is the principal object of the present invention to provide a continuous process for manufacturing microporous battery separators from a resinous mixture containing a solvent finely dispersed therein. It is a further object to provide a process which allows the continuous gelling of the resinous mixture to a sheet of predetermined thickness without allowing the solvent contained in the mixture to evaporate therefrom during this gelling step. It is a further object of this invention to provide a method which can be used to produce battery separators with good properties by a commercially feasible and therefore competitive process.

According to the invention there is provided a process of manufacturing microporous battery separators comprising the following steps:
a. preparing a solution of a thermosetting resin in a volatile medium;
b. mixing said solution with a curing agent suitable for said thermosetting resin;
c. feeding this mixture into the space between two endless synchronous moving pressure belts held at a predetermined distance from each other, this distance controlling the thickness of the products;
d. solidifying the mixture while it is pressed between the moving belts to prevent evaporation of the volatiles contained in the resin mixture to gel the resin and to form a continuous sheet with the volatiles finely dispersed therein;
e. evaporating the volatiles from the sheet after it has been gelled, and curing the resin; and
f. slitting the sheet to form battery separators of the desired size.

The success of the process depends basically on one concept, namely the retention of the minute solvent particles in the catalysed resinous mixture until the mixture has gelled. Preferably the gelling of the resin is carried out at elevated temperatures in order to increase the gelling rate. However, the temperature must be maintained below the boiling point of the solvent under the operating conditions to prevent a disrupture of the product by the vaporized solvent. No substantial external pressure can be applied to the product as the structure of the resin will collapse under pressure whereby the porosity of the separators will be lost.

When carrying out the preferred process of the invention the resin precursors are first blended together. Frequently it may be advantageous to prepare two stock solutions which will not react by themselves. These solutions are then combined in conventional manner, preferably with agitation. When a resin is used which gels by chemical condensation then the resin precursors may simultaneously be precondensed in this stage of the process. The resin solution may then be cooled in order to store it prior to its use. At this stage the resin mixture must still be fluid so that the homogeneous mixture may be evenly distributed when feeding it into the two endless pressure belts which are used according to this invention for the gelling step. A curing agent, i.e., a catalyst increasing the gelling rate of the resin mixture is added immediately prior to the gelling. This may be accomplished in a mixing head from which the solution is then fed to the endless belts.

The process may be carried out by employing a suitable thermosetting resin dissolved or dispersed in a volatile medium which can be solidified to dimensionally stable sheets containing the volatile solvent finely dispersed therein, so that microporous sheets are obtained after evaporation of the volatiles. The preferred solvent medium is water but other volatile solvents which do not react with the resin mixture may be used. It has further been found that the resin mixture must contain a thermosetting resin which is compatible with the solvent used and which will form a solid resin backbone under curing conditions and will not collapse upon evaporation of the solvent. When water is used as the solvent, particularly preferred resins are the condensation products of formaldehyde or other aldehydes with hydroxy benzenes. Suitable hydroxy benzenes are resorcinol, pyrogallol and phloroglucinol, the resorcinol being particularly preferred. There may be added other thermosetting resins, e.g., formaldehyde/phenol resins. The mechanical properties of the product may be varied within a broad range by incorporating also thermoplastic resins like polyolefins, polyvinyl chloride or polyvinylidene chloride and others, or polymer lattices like natural rubber or synthetic rubber polymers, e.g., butyl rubber lattices. However, it should be understood that the invention is not restricted to the resins mentioned above since any solution of a thermosetting resin in a volatile medium may advantageously be used which can be solidified under the conditions of the process to sheets containing the volatiles dispersed therein.

The selection of the curing agent depends of course on the nature of the thermosetting resin used. As examples may be mentioned the condensations of hydroxy benzene/formaldehyde resins which are accelerated by adding strong acids like nitric acid, hydrochloric acid, sulfurous acid, formic acid, sulfuric acid or phosphoric acid.

The resin mixture can contain up to 300 percent by weight of fillers and/or fibers. Suitable fillers are silica, alumina, carbon black or carbon dust, mica, kaolin, asbestos, diatomaceous earth, vermiculite, calcium silicate, aluminum polysilicate, wood flour, glass particles, barium sulfate, or mixtures of these materials. The addition of such fillers allows considerable savings of resin without impairing the properties of the battery separators. Actually it is also found that the mechanical properties are considerably improved by the addition of fillers.

The mechanical properties may further be improved by incorporating fibers, such as glass, cellulose, asbestos or synthetic fibers. In carrying out the process the fibers are preferably used in the form of fiber mats, which are introduced between the two belts together with the resinous mixture. Two methods of adding the fibers have been found to be particularly advantageous.

1. Bulk fibers are placed in a feeder hopper and thence fed continuously to a distribution box. The fluffed fiber is then deposited by an airstream on a moving screen and is held in place by suction applied below the screen. The air formed fiber web leaving the screen may be released, picked up and transferred by air to a vacuum transfer belt which partially compacts the fibers prior to the entry into two roller compactors pressing the fibers into a shaped web. This method is particularly suited for the incorporation of scrap fibers.

2. A roll of fibers preformed into a web is placed on an unwind stand and fed directly into a pair of roller compactors.

From the roller compactors the web is passed on to the two belts where it is penetrated by the resinous mixture. The roller compactors may be grooved in the shape required by the protruding ribs of the finished separator. The clearance between these rollers can be adjusted to size the fibrous web depending on the desired size of the final separator. It will be apparent that the belt must be formed with grooves coinciding with the shaped grooves in the fibrous mat.

In carrying out the process of the invention two endless pressure belts are used which are each guided over at least two rollers. In this context the term "pressure" does not refer to externally applied pressure but only to the fact that the two runs of the belts opposing each other are held under tension at a predetermined distance from each other. When the fluid resinous mixture passes through the space between the two belts the thickness of the resinous layer will correspond to the height of the space. Generally, it is preferable to guide the belts over at least three drums (or drum rollers) thereby facilitating the adjustment of the belts over their entire length but it will be apparent that the belts may be mounted in any manner which allows control of the distance of the two runs of the belts opposing each other and of the tension applied to them.

The two pressure belts are made of a material which is not permeable to solvents or vapors so that the volatiles contained in the resinous mixture cannot evaporate during the gelling step. The belts are preferably made of stainless steel. Many other common materials cannot be used for the belts when carrying out the process of the present invention because the gelled resinous mass will stick to their surface. Highly water repellent materials on the other hand may lead to the formation of a nonporous skin on the sheet of gelled resin. Steel has performed well in both respects. Viton, a polymeric fluorocarbon material marketed by the Du Pont Company, Wilmington, Delaware can also be used but it is less advantageous than steel because of its high cost; also, Viton and other suitable plastic materials will wear off gradually while steel belts can be used for extended periods of several years. While the belt material is critical for the success of the present process it will be understood that any elastic material which can be formed into an endless belt and to which the resinous material will not stick can also be used. If a nonporous skin on the resin sheet is formed this may be removed by planing of either or both surfaces, or its formation may be prevented by addition of wetting agents into the resin precursors. It has been found that a uniform distribution of the fluid resinous mixture between the two synchronously moving belts may be achieved in a very convenient manner if the lower of the two belts is longer and projects with its backward portion beyond the upper belt; the mixture may then be fed on to the lower belt and the distribution can be accomplished by adjusting the slope of this part of the lower belt to the viscosity of the mixture. Suitable means such as a distribution die may be employed to spread the resinous mixture over the entire breadth of the belts.

The length of the belt portions opposing each other and the running speed of the belts must be adjusted to the gelling rate of the resin mixture since it is essential that the mixture is solidified to a dimensionally stable product when it leaves the two belts at the discharge end. The gelling rate may be increased by adding a suitable curing agent and further by heating during the gelling. Heating of the resinous mixture during solidification will generally be accomplished by heating the two adjacent runs of the belts. The mode of heating the belts is not critical although it will be appreciated that the temperature distribution should be as uniform as possible and that a temperature gradient over the breadth of the belts should be avoided. With one possible embodiment the belts are passed through an enclosure in which a highly saturated steam atmosphere is maintained, thereby heating the belts to the steam temperature and simultaneously avoiding evaporation of water at the belt edges when an aqueous resin solution is used. Alternatively the belts may be passed through a hot liquid bath, preferably a hot water bath, or the belts may be sprayed with a hot liquid. The hot liquid may be circulated in a conventional manner in order to save energy required for heating the liquid. According to still a further embodiment the belts are passed through a high frequency induction field which also allows the desired uniform inductive heating of the belts. A temperature gradient in the running direction of the belts may be desirable and can be adjusted with temperature control means. Thus, it may be advantageous to increase the temperature gradually from the feed end to the discharge end of the belts.

The two belts are still relatively hot when returning from the discharge end to the feed end. This may create difficulties for the distribution of the resin mixture which may tend to solidify on the hot belt before it has been spread evenly over the entire breadth of the belt and has passed through the slit formed by the two belts. Accordingly both the belts or only the lower belt, may be cooled while returning from the discharge end to the feed end in order to facilitate the distribution of the resin mixture at the feed end.

The resinous sheet which is discharged from between the pressure belts still contains the volatiles initially incorporated in the solution as well as the catalyst which has been added prior to the solidification step. Normally, the sheet leaving the two belts will therefore be processed further by first washing it to remove soluble components, notably the curing agent which may later interfere with the battery operation. Subsequently the sheets are dried and then cured, if necessary. Whether an additional heating is necessary depends on the nature of the resinous mixture used; some type of resin will be cured completely during the heating between the two belts and others will cure at room temperature without the need of further heating.

In order to obtain battery separators of the desired size from the sheet leaving the belts, this sheet is slit after the drying and may then be wound up to rolls of conventional size. These rolls may then be processed further with the conventional equipment used for the manufacture of battery separators of known type, e.g., cellulosic separators impregnated with phenol/formaldehyde resin. This equipment may include curing ovens and cutting devices. Further, ribs of a suitable material, for instance polyvinyl chloride may be extruded onto and fixed to one side of the separator bands after curing but prior to cutting.

Belts may be used, one or both of which have corresponding grooves in their surfaces so that after solidification of the resinous mixture, sheets with integral ribs on one or both sides are obtained. Thus, it is possible to employ only one belt with small longitudinal grooves whereby sheets with thin ribs on one side are obtained. To the opposite side of said sheets may then be fixed by extrusion larger ribs of a material such as polyvinyl chloride.

It is further possible to plane part of the surface or the entire surface of the battery separators after curing of the resinous sheets to adjust the thickness of the product although this will normally not be necessary since the present process allows the manufacture of battery separator sheets within a very narrow tolerance range. At a total thickness of the sheets of 0.5 mm. the tolerances are within the range of ±0.03 mm.

The present invention will now be illustrated merely by way of example, by describing one embodiment thereof in connection with the attached flow sheet. However, it is not intended to limit the scope of the invention to this embodiment.

Now referring to the flow sheet, two stock solutions are prepared in the mixing tanks $A_1$ and $A_2$, each of which is equipped with mechanical stirring means. In the mixing tank $A_1$ a resin precursor $R_1$, the solvent (preferably water as indicated), and a filler $F_1$ are blended together; similarly mixing tank $A_2$ is filled with a resin precursor $R_2$, solvent (water) and a filler $F_2$. More specifically the resin precursor $R_1$ may be phenol and resorcinol and resin precursor $R_2$ may be a formaldehyde solution. Alternatively phenol and formaldehyde may be blended in one mixing tank since these components will not react with each other at room temperature without the addition of an accelerator. The fillers $F_1$ and $F_2$, respectively, may be quartz dust and silica.

The two starting solutions from the mixing tanks $A_1$ and $A_2$ are then mixed in a further mixing vessel $B_1$. In the process as illustrated there is used a series of cascade reactors $B_1$, $B_2$ and $B_3$. The mixture overflowing from reactor $B_1$ is introduced at the bottom reactor $B_2$ and the mixture overflowing from reactor $B_2$ is passed on to the bottom of reactor $B_3$. In this series of reactors the resin mixture will be precondensed under agitation. Due to the heat of reaction the temperature will usually rise during this step of the process.

The precondensed resin mixture leaving reactor $B_3$ is cooled in a cooler C and may then be stored at this temperature in a storing tank S. From this storing tank S the resin mixture is fed into a mixing head M in which the curing agent is added from a separate storage tank CA. The mixture goes to a metering device and a distributor (not shown). The resin mixture is distributed on the sloped portion $L_1$ of a lower belt L. The slope of this portion will be adjusted to the running speed of the belt and the viscosity of the resin mixture so that no considerable back flow of the mixture will occur. The mixture deposited on run $L_1$ of the lower belt will then enter the space formed between the upper belt U and the lower belt L at the rollers $Ro_1$ and $Ro_2$ at the feed end. The resin mixture is enclosed by the two adjacent runs of the belts U and L. It will be appreciated that these adjacent portions must run with synchronous speed so that no relative movement between the two belts occurs. As described above, the two adjacent portions will normally be heated by suitable means in order to speed up the gelling of the resin. The two belts are guided over further rollers $Ro_5$, $Ro_6$ and $Ro_7$, respectively, which facilitate the adjusting and tensioning of the belts L and U.

A fiber mat FM leaving an unwind stand US is fed to the sloping run $L_1$ of the lower belt L from where it enters the slit between the two belts together with the resin mixture.

The solidified sheet leaving the two belts is passed through a washing station W where it is freed from soluble impurities which could interfere with its later use in electric storage batteries. In the present example this will be in particular the acid used as curing agent for the resin mixture. After leaving the washing station the sheets are dried by heating or by applying reduced pressure so that all volatiles will evaporate. From the drying station D the sheet is passed on to a slitting apparatus S1, and may then be wound up to obtain rolls of the porous sheets or may be passed on directly to a curing oven CUR in which the curing of the resin is completed by heating the sheets.

Finally there may be extruded on to and fixed to one side of the sheets ribs of a suitable material such as polyvinyl chloride, which is also used for battery separators of conventional type. The sheets leaving the rib extrusion apparatus RE are then cut by a cutter CUT to battery separators of a size corresponding to the dimensions of the battery plates of the storage battery for which the separators are to be used.

We claim:

1. A continuous process of manufacturing microporous battery separators, comprising:
    a. preparing an aqueous solution of a phenol-aldehyde resin precursors;
    b. adding a curing agent to said aqueous solution;
    c. placing the solution onto a sloped portion of an endless nonpermeable pressure belt having a steel or polyfluorocarbon surface, said solution being carried upward until it meets an overhead endless pressure belt made of the same material;
    d. allowing the solution to enter the space between the two parallel synchronously moving pressure belts which are maintained at a constant and determinate distance from each other;
    e. heating the confined moving solution at a temperature sufficient to cause gellation and below the boiling point of said aqueous resin precursors solution;
    f. evaporating the water from the solidified mixture after it has left the space between the belts;
    g. curing the resin sheet obtained; and
    h. slitting the cured sheet into battery separators.

2. The process of claim 1 wherein the resin precursors in the solution are partially condensed.

3. The process of claim 1 wherein the resin precursor solution also contains a thermoplastic polymer.

4. The process of claim 1 wherein fibers are incorporated into the resinous mixture prior to gellation.

* * * * *